(12) United States Patent
Moroney et al.

(10) Patent No.: US 12,259,274 B2
(45) Date of Patent: Mar. 25, 2025

(54) SPECTRALLY MULTIPLEXED SINGLE-PHOTON EMITTER

(71) Applicant: ORCA Computing Limited, London (GB)

(72) Inventors: Niall Moroney, London (GB); Robert Francis-Jones, London (GB); Paris Andreades, London (GB)

(73) Assignee: ORCA Computing Limited, London (GB)

( * ) Notice: Subject to any disclaimer, the term of this patent is extended or adjusted under 35 U.S.C. 154(b) by 285 days.

(21) Appl. No.: 17/965,692

(22) Filed: Oct. 13, 2022

(65) Prior Publication Data
US 2024/0011829 A1    Jan. 11, 2024

(30) Foreign Application Priority Data
Jul. 11, 2022    (GB) ...................................... 2210163

(51) Int. Cl.
*G01J 1/44*        (2006.01)
*G01J 1/04*        (2006.01)
(Continued)

(52) U.S. Cl.
CPC ............... *G01J 1/44* (2013.01); *G01J 1/0418* (2013.01); *G01J 1/0459* (2013.01);
(Continued)

(58) Field of Classification Search
CPC .......... G01J 1/44; G01J 1/0418; G01J 1/0454; G01J 1/0488; G02F 1/3503; G02F 1/212; G02F 1/3526; G02F 1/353; G02F 1/39
See application file for complete search history.

(56) References Cited

U.S. PATENT DOCUMENTS 9,952,482 B2 *   4/2018   Rudolph ............... G02F 1/3536
2018/0231868 A1  8/2018   Grice et al.
(Continued)

FOREIGN PATENT DOCUMENTS

WO    WO 2022/074197 A1    4/2022

OTHER PUBLICATIONS

Intellectual Property Office of the United Kingdom, Combined Search and Examination Report, GB2210163.8, Feb. 1, 2023, eight pages.

(Continued)

*Primary Examiner* — Paul E Callahan
(74) *Attorney, Agent, or Firm* — Fenwick & West LLP (57) ABSTRACT

A system is provided for producing an output photon having a predefined frequency. A pump module produces a plurality of pump fields at a plurality of pump frequencies. A photon pair source module generates frequency-correlated photon pairs. A detector module generates a heralding signal subsequent to detecting a first photon of a photon pair, the heralding signal indicative of a frequency of the second photon of the pair. A non-linear photonic element is arranged to (1) receive the heralded second photon and a complementary selected pump field, and (2) to produce an output photon having the predefined frequency. A pump field selector is configured to (1) receive a heralding signal and (2) select, based on the received heralding signal, a pump field of the plurality of pump fields for provision to the non-linear element. Methods, controllers and computer-readable media are also described herein.

18 Claims, 6 Drawing Sheets

(51) Int. Cl.
*G02F 1/21* (2006.01)
*G02F 1/35* (2006.01)
*G02F 1/39* (2006.01)

(52) U.S. Cl.
CPC ............ *G01J 1/0488* (2013.01); *G02F 1/212* (2021.01); *G02F 1/3503* (2021.01); *G02F 1/3526* (2013.01); *G02F 1/353* (2013.01); *G02F 1/39* (2013.01); *G01J 2001/442* (2013.01); *G02F 2203/48* (2013.01)

(56) References Cited

U.S. PATENT DOCUMENTS

2018/0307118 A1* 10/2018 Sciancalepore ....... G02F 1/3536
2022/0050043 A1*  2/2022 Ozdemir ............ G01N 15/1434
2023/0367176 A1* 11/2023 Clemmen .............. G02F 1/395

OTHER PUBLICATIONS

Joshi, C. et al., "Frequency Multiplexing for Quasi-Deterministic Heralded Single-Photon Sources," arXiv:1707.00048v2, Sep. 1, 2017, pp. 1-28.

* cited by examiner

SPECTRALLY MULTIPLEXED SINGLE-PHOTON EMITTER

CROSS-REFERENCE TO RELATED APPLICATION

This application claims priority to United Kingdom Application No. GB2210163.8, "Spectrally Multiplexed Single Photon Emitter," filed on Jul. 11, 2022, which is hereby incorporated by reference in its entirety.

TECHNICAL FIELD

The present disclosure relates to single-photon emitters, and in particular to single-photon emitters capable of emitting a single photon at a predefined frequency.

BACKGROUND

Single photons are useful for a variety of applications including metrology, quantum computing, quantum cryptography, imaging and random number generation. Accordingly, there is a need for reliable single-photon sources. An ideal single-photon source is capable of producing a single photon in a predefined field mode on-demand. In other words, each and every time that a user requires a single photon to be generated in that predefined field mode. In reality, such ideal single-photon sources are unrealizable due to losses and non-zero probabilities of producing multiple photons in the same mode.

Figure 1:
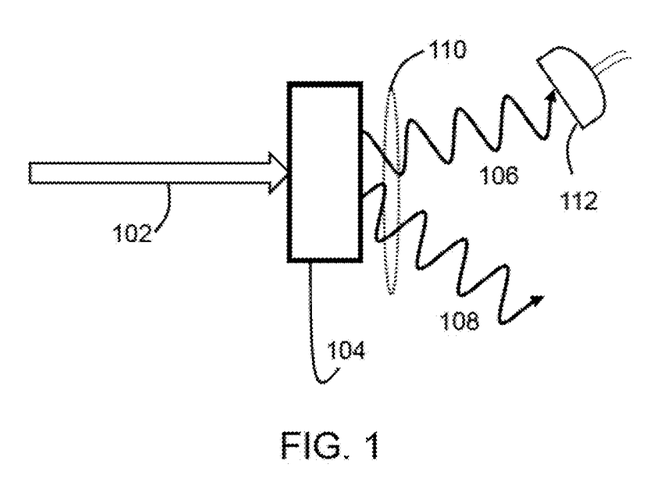
FIG. 1 shows an illustration of a heralded single-photon source according to an example.

Many known single-photon sources are probabilistic in nature and typically emit photons in pairs, the detection of one photon heralding the generation of the other. An example of a probabilistic single-photon source is illustrated in FIG. 1. A pump beam 102 is applied to a non-linear photon source 104 that probabilistically generates a photon pair 110. A first photon 106 (which may be referred to as an idler photon) is received by a detector 112, thereby heralding the production of the second photon 108 (typically referred to as a signal photon).

Probabilistic single-photon sources typically rely on non-linear processes such as spontaneous parametric down conversion (SPDC) or spontaneous four-wave mixing (SFWM). However, these non-linear processes are probabilistic and so cannot simultaneously achieve a high probability of producing a photon and a high single-photon fidelity. For example, in these non-linear processes the probability of a single photon being produced in a particular mode and the probability of two photons being produced in that mode are strongly linked, and so such sources are often operated in the regime of low-excitation probability. This in turn means that the time at which a single heralded photon will be produced is highly unpredictable. Nevertheless, the single photon fidelity of the heralded photon can be very high as the multiphoton component can be made arbitrarily small.

The unpredictability of these probabilistic single-photon sources makes them unreliable for many applications in which large quantities of single photons may be required, especially if such applications command that single photons should be generated on-demand and in a particular predefined field mode (for example at a particular frequency).

The present disclosure mitigates one or more problems of the prior art.

SUMMARY

According to an aspect of the disclosure, a system is provided for producing an output photon having a predefined frequency. The system comprises a pump module configured to produce a plurality of pump fields at a plurality of pump frequencies. The system further comprises a photon pair source module for generating frequency-correlated photon pairs. The system further comprises a detector module comprising one or more photon detectors, each photon detector arranged to cause the generation of a heralding signal in response to a detection of a first photon of a frequency-correlated photon pair, the heralding signal indicative of a frequency of the heralded second photon of the frequency-correlated photon pair. The system further comprises a non-linear photonic element arranged to receive the heralded second photon and a complementary selected pump field, and to produce an output photon having the predefined frequency. The system further comprises a pump field selector configured to: receive a heralding signal; and select, based on the received heralding signal, a pump field of the plurality of pump fields for provision to the non-linear element.

As described further above, in many applications it is desirable to produce photons on-demand an in a particular predefined field mode (for example, at a particular frequency). Advantageously, the systems described herein enable the constraints on a photon pair source module to be relaxed. The photon pair source module can generate signal photons (herein "second photons") across a wide spectral range that are combined at the non-linear photonic element with a suitable selected pump field to produce an output photon having the predefined frequency. This in turn means that a photon pair source module can be used that generates photon pairs at a higher rate than would be possible with, for example, the single-photon source of FIG. 1. Accordingly, one can produce output photons having the predefined frequency at a higher rate than would be possible with the single-photon source of FIG. 1. Accordingly, the systems described herein can be configured as on-demand single photon sources. The pump field selector may comprise a plurality of controllable filtering elements, each aligned with a respective pump field and configured to controllably prevent unwanted pump fields from reaching the non-linear photonic element.

At least one filtering element may comprise a shutter.

At least one filtering element may comprise a semiconductor optical amplifier configured to controllably amplify or absorb the respective pump field with which the amplifier is aligned.

At least one filtering element may comprise an electro-optic intensity modulator. At least one electro-optic intensity modulator may comprise a Mach-Zehnder interferometer.

The system may further comprise a wavelength combiner arranged to receive a selected pump field from a filtering element and output the selected pump field towards the non-linear photonic element. The wavelength combiner may comprise a wavelength division multiplexer (WDM).

The pump module may comprise a plurality of pump laser sources, each for generating a corresponding pump field.

The system may further comprise a controller for controlling the pump field selector to select a pump field in response to the heralding signal. The controller may be implemented in an application specific integrated circuit (ASIC) or field programmable gate array (FPGA). In some examples, the non-linear photonic element may have different conversion efficiencies for different frequencies of heralded second photons, and in the event of a contemporaneous detection of two first photons of two frequency-correlated photon pairs, the two first photons having different frequencies, the controller may be configured to control the pump field selector to select a pump field that complements the heralded second photon of the pair of heralded second photons for which the non-linear photonic element has the greater conversion efficiency.

At least a portion of the system may be implemented on-chip. At least a portion of the system may be implemented in bulk optics.

The photon pair source module may comprise a cavity parametric down conversion photon pair source.

The detector module may comprise a plurality of photon detectors. The detector module may further comprise a spectral demultiplexer for guiding photons along a plurality of frequency-dependent lightpaths. Each of the photon detectors may be coupled to a respective frequency-dependent lightpath of the spectral demultiplexer such that a detection event at a particular photon detector is associated with the detection of a photon having a frequency within a particular frequency range.

The spectral demultiplexer may comprise at least one microresonator for providing at least one of the frequency-dependent lightpaths. The spectral demultiplexer may comprise at least one of a prism, a dense wavelength demultiplexer, a fibre Bragg grating, or a dichroic filter.

The non-linear photonic element may have a second order non-linearity.

The system may further comprise a beam combiner arranged to combine the heralded second photon and the selected pump field.

According to an aspect of the disclosure, a method is provided. The method is suitable for performance by a controller. The method comprises selecting, based on a received heralding signal, a pump field from a plurality of pump fields having a corresponding plurality of pump frequencies. The method further comprises causing, based on the selection, a pump field selector to permit the selected pump field to be incident on a non-linear photonic element. The received heralding signal is representative of the detection of a first photon of a frequency-correlated photon pair, the heralding signal indicative of a frequency of the heralded second photon of the frequency-correlated photon pair from among a plurality of possible frequencies. The non-linear photonic element is further arranged to receive the heralded second photon and to produce an output photon having a predefined frequency based on the frequency of the heralded second photon and the pump frequency of the selected pump field.

In some examples, the non-linear photonic element may have different conversion efficiencies for different frequencies of heralded second photons. In the event of a contemporaneous detection of two first photons of two frequency-correlated photon pairs, the two first photons having different frequencies, selecting a pump field may comprise selecting a pump field that complements the heralded second photon of the pair of heralded second photons for which the non-linear photonic element has the greater conversion efficiency.

According to an aspect of the disclosure, a controller is provided. The controller is configured to perform a method as described herein.

According to an aspect of the disclosure, a computer-readable storage medium is provided. The computer-readable storage medium has stored thereon a computer-readable circuit description of a controller for performing a method as described herein. The computer-readable circuit description, when processed in a controller generation system, causes the controller generation system to manufacture or otherwise generate an implementation of the controller. The computer-readable medium may comprise a non-transitory computer-readable medium.

Many modifications and other embodiments of the disclosure set out herein will come to mind to a person skilled in the art in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the scope of the disclosure.

BRIEF DESCRIPTION OF THE DRAWINGS

Embodiments of the disclosure will now be described by way of example only, with reference to the accompanying figures, in which.

Throughout the description and the drawings, like reference numerals refer to like parts. Furthermore, features in the drawings are not drawn to scale.

DETAILED DESCRIPTION

Whilst various embodiments are described below, the disclosure is not limited to these embodiments, and variations of these embodiments may well fall within the scope of the invention which is to be limited only by the claims.

As explained above in relation to FIG. 1, a pump beam can be used to probabilistically generate pairs of photons by providing the pump beam to a non-linear photonic element. Due to conservation of energy and momentum, the resultant photon pairs are entangled and the wavelengths/frequencies of the photons of each photon pair will be strongly correlated—if one were to measure the frequency of a first photon of the photon pair, one is able to determine the spectral properties of the (heralded) second photon of the photon pair without the need to directly measure the frequency of the second photon. Accordingly, if one knows the frequency of the first photon of a photon pair, then one can determine an appropriate transformation to be made to the frequency of the second photon of the photon pair to generate an output photon with a desired frequency.

As used herein, the words "first" and "second" in relation to the photons of a photon pair, are intended to act as labels of the photons of a photon pair and are not intended to be limiting. For example, a photon pair source may generate a plurality of photon pairs, and therefore generate a plurality of first photons and a plurality of second photons.

Figure 2:
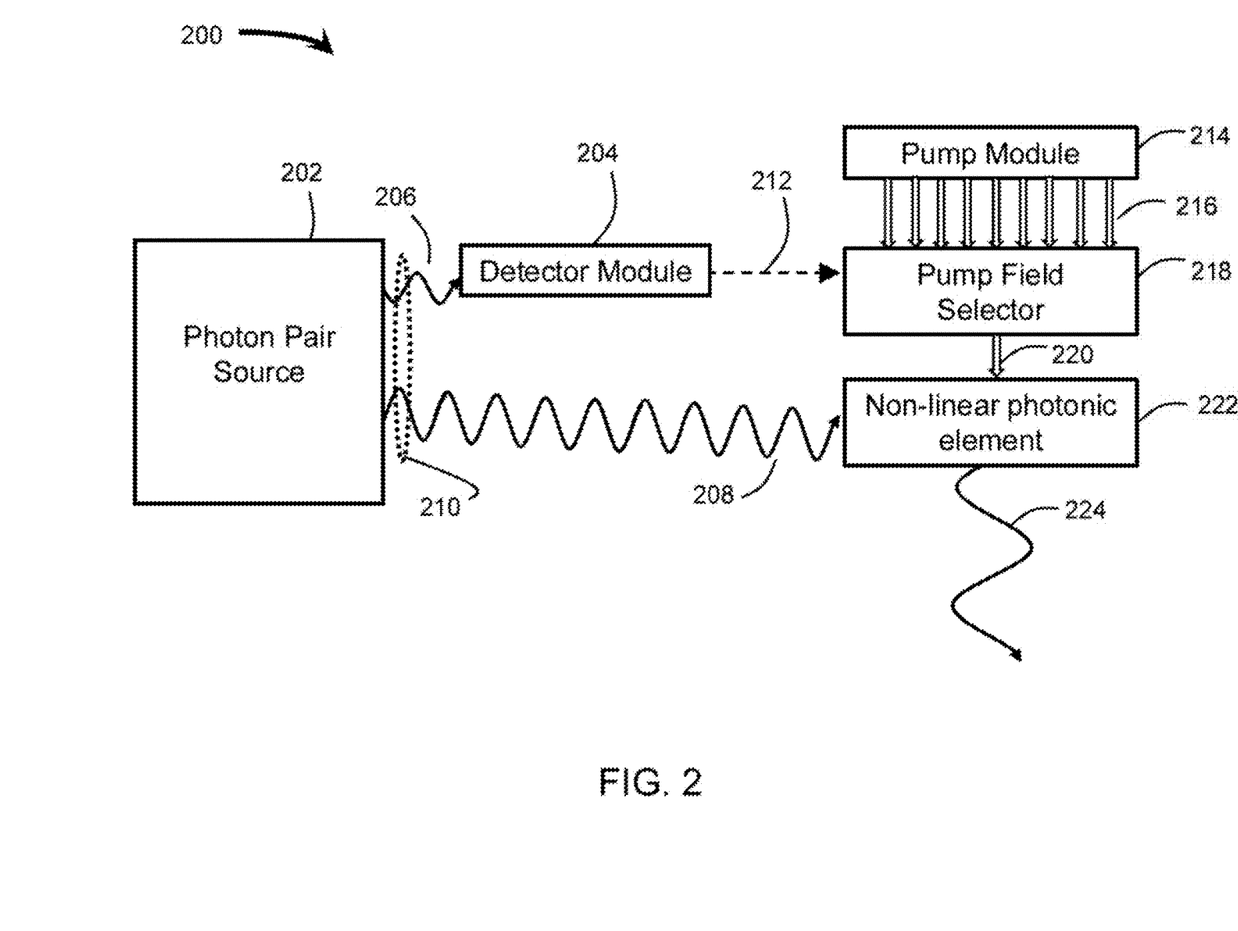
FIG. 2 shows an illustration of a system for producing a photon of a predefined frequency according to an example.

FIG. 2 illustrates a system 200 for producing an output photon 224 having a predefined frequency. The system 200 comprises a photon pair source 202, a detector module 204, a pump module 214, a pump field selector 218, and a non-linear photonic element 222. The skilled person will appreciate that other architectures are available. For example, the system may comprise more features.

In FIG. 2 and the other drawings herein, unless the context otherwise allows, a hollow arrow or plurality of hollow arrows indicates a path of classical light, while a solid undulating/oscillating arrow indicates a path of quantum light (i.e. one or more photons). A dashed arrow is understood to mean a flow of classical information, in analogue or digital form, such as a control signal. The paths indicated do not represent actual physical paths, but merely show how the light/photons/signals may be directed to and from different features of the described systems.

The system 200 utilizes spectral multiplexing to more reliably produce an output photon at a predefined frequency. Accordingly, a photon pair source module that generates photons across a wide spectral range may be used. This means, that a photon pair source module can be used that generates photon pairs at a higher rate than would be possible with, for example, the probabilistic single-photon source of FIG. 1. As explained further above, probabilistic single-photon sources typically rely on non-linear processes such as spontaneous parametric down conversion (SPDC) or spontaneous four-wave mixing (SFWM). Such probabilistic processes cannot simultaneously achieve a high probability of producing a photon and a high single photon fidelity. For example, in these non-linear processes the probability of a single photon being produced in a particular spectral mode and the probability of two photons being produced in that spectral mode are strongly linked, and so such sources are often operated in the regime of low-excitation probability. This in turn means that the time at which a photon pair 110 will be produced is highly unpredictable. One can boost the probability of obtaining a photon pair by not requiring that the signal photon be produced in a particular mode, but instead by requiring that the signal photon be produced having a frequency from among a plurality of frequencies. In such circumstances, spectral multiplexing can be used to more reliably generate an output photon 224 on demand that has a predefined frequency.

The photon pair source module 202 is configured to probabilistically generate pairs 210 of frequency-correlated photons across a range of spectral modes. That is, the first (second) photon 206 (208) of each photon pair may have a frequency from among a plurality of possible frequencies.

The photon pair source module 202 comprises non-linear media having a second-order or third-order non-linearity. For example, the photon pair source module 202 may generate photon pairs based on spontaneous four wave mixing (SFWM) or spontaneous parametric down conversion (SPDC). Any suitable photon pair source capable of producing photon pairs across a range of spectral modes are suitable. For example, the photon pair source module 202 may comprise a plurality of non-linear elements, each pumped by slightly different pump lasers. Alternatively, a photon pair source may comprise a cavity source, for example as described below in relation to FIG. 4A.

The detection module 204 comprises one or more photon detectors. The photon detectors may be photon number resolving (PNR) detectors, capable of determining how many photons are received. For example, the photon detectors may comprise superconducting nanowire detectors that generate an output signal intensity proportional to the (discrete) number of photons that strike a detector. PNR detectors are useful in circumstances where it is useful to know whether multiple photons are being generated in the same spectral mode at the same time. Alternatively, the photon detectors may not have PNR capabilities. For example, the detectors may comprise avalanche photodiodes. For example, the detectors may comprise transition edge sensors (TESs).

The detection module 204 is arranged to cause the generation of the heralding signal 212 in response to a detection of a first photon 206 of a frequency-correlated photon pair 210. To this end, the detection module 204 is configured to place the first photon 206 in a particular spatial or temporal mode based on a frequency of that first photon 206, and accordingly a detection event in a particular spatial or temporal mode is indicative of a frequency of that first photon, and by extension is indicative of a frequency of the corresponding second photon.

The pump module 214 is configured to generate a plurality of pump fields 216 at a plurality of pump frequencies. A pump field is a coherent laser field. While nine pump fields 216 have been shown in FIG. 2, the skilled person will appreciate that there may be more or fewer pump fields 216. The pump module 214 may generate the pump fields in any suitable way. In some examples, the pump module 214 comprises a plurality of laser sources, each generating a pump field at different frequency.

The pump field selector 218 is configured to receive a heralding signal 212 representative of the detection of a first photon of a frequency-correlated photon pair, the heralding signal indicative of a frequency of the heralded second photon of the frequency-correlated photon pair from among a plurality of possible frequencies.

In some examples, the heralding signal may comprise an analogue or digital signal generated by a photon detector (not shown in FIG. 2) in response to detecting the first photon of the frequency-correlated photon pair. In some examples, the heralding signal may comprise an analogue or digital signal generated by a controller (not shown in FIG. 2) in communication with one or more photon detectors. The heralding signal 212 itself may be any suitable signal for conveying the information that a first photon has been detected, for example an electrical signal, a magnetic signal or an optical signal. In some examples, the pump field selector 218 may comprise one or more photodetectors, and the heralding signal may accordingly be a signal internal to the pump field selector 218. That is, receiving a heralding signal may comprise one portion of the pump field selector 218 receiving the signal from another portion of the pump field selector 218.

The pump field selector 218 is further configured to select, based on the received heralding signal, a pump field. The selection may be performed in any suitable way, and several embodiments are described herein. However, the skilled person will appreciate that any pump field selector 218 capable of selecting a single pump field or filtering out other pump fields may be utilised.

The non-linear photonic element 222 is configured to receive the heralded second photon 208 and the selected pump field 220 and produce an output photon 224 having the predefined frequency based on the frequency of the heralded second photon 208 and the complementary selected pump field 220. In some embodiments, the non-linear element comprises a beam combiner with non-linear material. As used herein, stating that the output photon has the predefined frequency means the output photon has a frequency that is within an error threshold of the predefined frequency. For example, the carrier frequency of the output field may not drift by more than 50% of the linewidth of the predefined frequency. In some embodiments, The non-linear element 222 may comprise a material having a second order ($\chi^{(2)}$) non-linearity. For example, a suitable material may be periodically-poled lithium niobate (PPLN) or potassium titanyl phosphate (KTP). The second order non-linear photonic element 222 may use sum-frequency generation (SFG), in which the received second photon 208 and a photon of the selected pump field 220 are annihilated and an output photon 224 is generated having a frequency that is the sum of the frequencies of the annihilated second photon 208 and the annihilated photon of the selected pump field 220. The second order non-linear photonic element 222 may use difference-frequency generation (DFG) in which the received photon 208 and a photon of the selected pump field 220 are annihilated and an output photon 224 is generated having a frequency that is the difference of the frequencies of the annihilated second photon 208 and the annihilated photon of the selected pump field 220. It is possible to obtain an output photon 224 of a predefined frequency by providing the second photon 208 and a suitable selected pump field 220 to the non-linear photonic element 222.

In some examples, the non-linear element 222 may comprise a material having a third order ($\chi^{(3)}$) non-linearity, for example a material that produces an output photon based on Bragg-scattering four-wave mixing. In this example, the pump field selector may select two pump fields as two pump fields may be required for the non-linear effect to be seen.

As the photon pair source module 202 is configured to generate frequency-correlated photon pairs across a range of frequencies, there is a non-zero probability that the two or more photon pairs are generated contemporaneously—that is, substantially simultaneously and within the same photon pair generation clock cycle (e.g within the pump pulse duration for the photon pair source module). In such circumstances, the detector module 204 may detect two first photons of different frequencies at the same time, thereby heralding the presence of two second (signal) photons having different frequencies. Some photon pairs may be more suitable than others for causing the system 200 to produce a good quality output photon 224 reliably. For example, dependent on the materials used in the system 200, the system 200 may be more susceptible to signal photon loss at one frequency than another. As another example, different pump fields may have different intensities which can influence the conversion rate for the output photon. As another example, depending on mismatches between the available pump fields to select from, and the frequencies of the signal photons produced by the photon pair source, some signal photons may be used to generate output photons having a higher purity than those generated by other signal photons. The non-linear photonic element 222 may have different conversion efficiencies for different frequencies of heralded second photons.

Accordingly, in the event of a contemporaneous detection of two first photons of two frequency-correlated photon pairs, the two photons having different frequencies, the system 200 may be configured to select a pump field that complements the heralded second photon of the pair of heralded second photons for which the output photon 222 is "better" according to some metric. For example, the selected pump field may help to produce the output photon having the higher purity, or that for which the non-linear photonic element 222 has the greater conversion efficiency. Such a selection may be handled in a number of ways. As a first example, a controller (not shown) of the detector module 204 may register that two detection events have occurred and may generate a heralding signal corresponding to the "best" first photon of the two detected first photons. As a second example, a controller (not shown) of the mode selector may receive a heralding signal indicative of the presence of both second photons, and may select the pump field that complements the "best" of the two second photons.

The system 200 may comprise additional components or modules. For example, the photons of the photon pair 210, the pump module 214, the selected pump field 220 and the output photon 224 may be propagated in optical fibres, in free space using bulk optic components, in integrated optic waveguides, in any other suitable waveguide device or in any combinations thereof.

The system 200 may comprise a beam combiner for combining the second photon 208 of the pair 210 of frequency-correlated photons with the selected pump field 220 for provision to the non-linear photonic element 222. The beam combiner may comprise, for example, a wavelength division multiplexer.

The system 200 may further comprise one or more filters. For example, a large proportion of the selected comb spectral mode 220 may be expected to pass through the non-linear photonic element 222 and accordingly the system 200 may comprise a filter to filter out the remainder of the selected pump field 220 and ensure that only the output photon 224 is emitted by the system 200.

The system 200 may comprise, for example, a beam separator for separating the first photon 206 from the second photon 208 and guiding the first photon 206 towards the detection module 204 and guiding the second photon towards the non-linear photonic element 222.

In examples, the system 200 may be provided in whole or in part as an integrated circuit (having photonic elements). For example, many of the features of system 200 may be provided as a photonic integrated circuit.

In some examples, the system 200 might be provided as a distributed system. For example, the system 200 may be formed of a plurality of units for or installation in a server or computer rack (such as a standard 19-inch server rack), with the modules interconnected with various optical fibre interconnects and/or control lines. For example, the photon pair source module 202 may be embodied in one or more units in a server rack. The detection module 204 may be embodied in one or more units in a server rack. The pump module 214, the pump field selector 218, and the non-linear photonic element 222 may be embodied in one or more units in a server rack.

Figure 3:
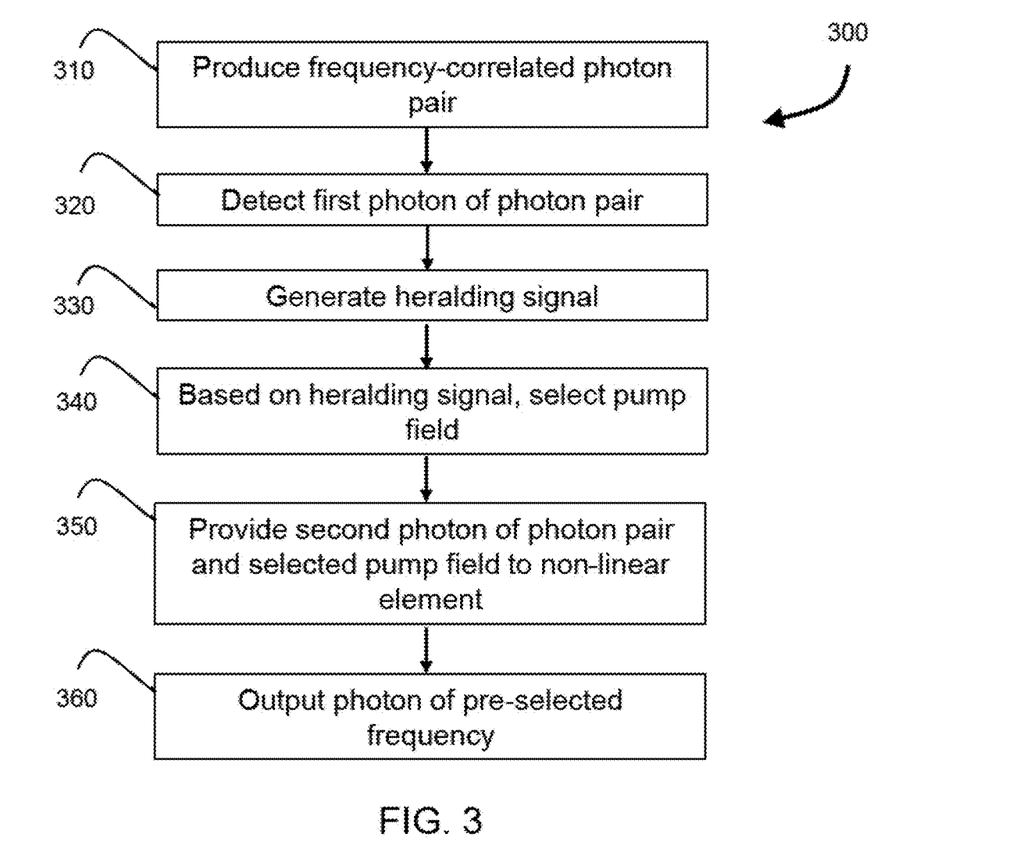
FIG. 3 shows a flowchart of a method for producing a photon of a predefined frequency according to an example.

In a preferred embodiment, the photon pair source 202 comprises a cavity source that produces photon pairs in the C-Band (with first photons having a frequency in the region of 1550n and second photons having a frequency in the region of 1530 nm) and the pump module 214 comprises a plurality of laser sources that produce pump fields in the L-Band (long-wavelength band: 1565-1625 nm). If the non-linear element has a second order non-linearity, then the output photon can have a predefined frequency of around 780 nm: the combination of a C-Band photon source module and an L-Band pump module greatly reduces noise around 780 nm, such as noise in second harmonic generation and noise in Raman scattering. FIG. 3 shows a flowchart of a method for producing an output photon 214 having a predefined frequency. The method is suitable for performance by a system such as that depicted in FIG. 2. In examples the method may be coordinated or otherwise controlled by a dedicated controller. The skilled person will appreciate that the process may comprise further steps.

At 310, a frequency-correlated photon pair 210 is produced, the photon pair 210 comprising a first photon 206 and a second photon 208. The first photon 206 has a frequency from among a plurality of possible frequencies. The second photon 208 accordingly also has a frequency from among a plurality of possible frequencies. With reference to FIG. 2, the photon pair source 202 is configured to generate the frequency-correlated photon pair.

At 320, the first photon 206 of the photon pair 210 is detected by a detector arrangement arranged such that a detection event can be correlated with the first photon 206 having a frequency that is either equal to a particular frequency or is within a particular frequency range. Accordingly, a detection event can be correlated with a frequency of the first photon 206 and by extension with a frequency of the second photon 208. With reference to FIG. 2, the detection module 204 is configured to detect the first photon 206.

At 330, a heralding signal 212 is generated. The heralding signal 212 is generated based on the frequency of the detected first photon 206. Accordingly, the heralding signal is indicative of a frequency of the (heralded) second photon 208 of the photon pair 210. With reference to FIG. 2, the detection module 204 is configured to generate the heralding signal 212.

At 340, a pump field is selected based on the heralding signal 212. With reference to FIG. 2, the pump field selector 218 is configured to receive the heralding signal 212 and, based on the heralding signal, select a pump field 216.

At 350, the second photon 208 of the photon pair 210 and the selected pump field 220 are provided to a non-linear photonic element. Due to a non-linear process, at 360 the second photon 208 and a photon of the selected pump signal 220 are both absorbed and an output photon 224 is produced. With reference to FIG. 2, the non-linear photonic element 222 is arranged to receive the second photon 208 and the selected pump field 220 and to accordingly produce the output photon 224.

Figure 4A:
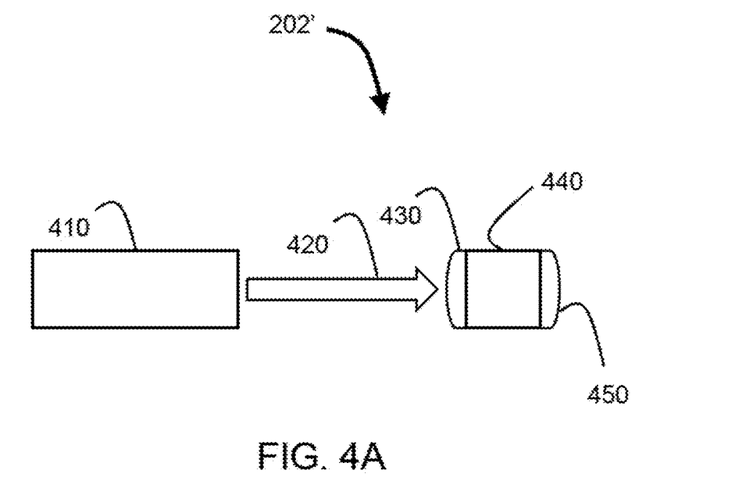
FIG. 4A shows an illustration of a photon pair source according to an example.

FIG. 4A shows an example photon pair source module 202', which in this example comprises a non-linear photonic structure 440 inside a photonic cavity having optically reflecting elements 430, 450. For example, the non-linear photonic structure 440 may be placed between mirrors, for example bulk optic mirrors, or Bragg gratings. As an example alternative, the non-linear photonic structure 440 may comprise a non-linear crystal waveguide with end facets covered with a reflective coating. The photon pair source of FIG. 4A is accordingly an example of a cavity parametric down conversion (CPDC) device. The optical cavity (430, 450) enables the confinement of light with frequencies such that the round-trip distance is equal to an integer number of wavelengths. Accordingly, there is a plurality of different frequency modes which satisfy this constraint. This set of frequency modes can be grouped as modal pairs that are equidistant in frequency about some central frequency. Each of these modal pairs can support the generation of a photon pair with frequencies equal to those of the associated modes. Accordingly, the CPDC is capable of producing a plurality of photon pairs across a range of frequencies.

The non-linear photonic structure 440 may use spontaneous four wave mixing (SFWM) or spontaneous parametric down conversion (SPDC) to convert pump light 420 into signal/idler photon pairs. For SPDC the resulting photon pairs have lower frequencies and longer wavelength than the pump light 420. Examples of materials that may be used as the non-linear optical medium of the non-linear photonic structure 440 include any of, but not limited to: $LiIO_3$., $\beta\text{-}BaB_2O_4$, $BiB_3O_6$, KTTP ($KTiOPO_4$), KTA, periodically-poled crystals, such as PPLN (Periodically Poled Lithium Niobate).

FIG. 4A further shows an optical source system 410, also referred to as a "source system" or "pump system". The pump system 410 is configured to generate a pump beam 420. In other examples, the pump system 410 may be considered to be part of the photon pair source 302'.

Figure 4B:
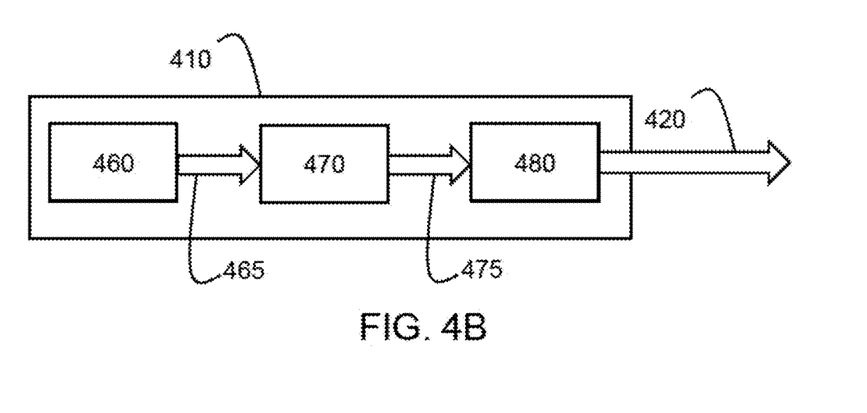
FIG. 4B shows an illustration of a pump source system, according to an example, that may be used as part of a photon pair source such as that depicted in FIG. 4A.

An example pump system 410 is shown in FIG. 4B, although the skilled person will appreciate that other pump systems may be suitable. The pump system 410 in FIG. 4B comprises components including at least an optical source 460 configured to receive one or more electrical signals and output light 465. Examples of the optical source 460 include but are not limited to a laser, such as a distributed feedback (DFB) laser. The optical source 460 may output light that is pulsed or continuous wave (CW). The wavelength of operation of the optical source may be any wavelength, for example between 700-1700 nm, or more of the following bands: the O-band (original band: 1260-1360 nm); the C-band (conventional band: 1530-1565 nm), the L-band (long-wavelength band: 1565-1625 nm); the S-band (short-wavelength band: 1460-1530 nm); the E-band (extended-wavelength band: 1360-1460 nm). The wavelength of operation of the optical source 460 may be a telecommunications wavelength, for example between 1300 nm and 1600 nm. The optical source may be wavelength tuneable.

The output light 465 is input into an optical modulator 470 which outputs light pulses 475. The light pulses may be gated by the optical modulator 470 to have any desired repetition frequency, for example a frequency continuously tunable between 100 kHz and 1 GHz. In some examples the optical modulator may not be used and the desired pulses may be output directly from the optical source 460 which may be directly modulated or comprise an integrated optical modulator. The optical modulator may be an absorption-based modulator or an interferometric-based modulator such as a Mach-Zehnder modulator.

The output of the optical modulator 475 is input into a series of one or more further non-linear optical elements 480, for example optical elements set up to use second harmonic generation (SHG) to convert input light 475 into frequency doubled output light 420. FIG. 4B shows a single further non-linear photonic element 480, however the pump system 410 may comprise a series of two or more further non-linear photonic elements 480, each outputting its light into the next element, for example a series of two SHG based optical elements each frequency doubling its input light. The optical output 420 of the chain or one or more further non-linear photonic elements 480 is input into cavity (430, 450) as pump light. Examples of types of further non-linear optical elements 480 include but are not limited to bulk or waveguided SHG stages comprised of non-linear optical materials such as ppLN, ppKTP, either in a single pass or a multi-pass cavity configuration. Using frequency doubling elements 480 in the pump system 410 enables the use of standard lasers such as standard telecommunication lasers to be the initial optical source 460 for the system 200 if the wavelength of the photon pairs 210 is to be less than or equal to the wavelength of the optical source 460.

The components of the optical source system 410 may be formed separately and optically linked to each other or any one or more of them may be integrated together. The optical links between any two of the components of the optical source system may be any of: free space, optical fibre, integrated waveguides. The optical source system 410 may have other components such as but not limited to, optical amplifiers or optical attenuators to control the light amplitude of any of light signals 465, 475, 420 and optical polarization controllers to control the polarization of any of light signals 465, 475, 420.

The pump source 410 (for example, the optical source 460 and/or the optical modulator 470) may in some examples receive electronic signals derived from detection signals from the detection module 204. This enables the detection of the first photons 206 of generated photon pairs 210 to feed back into the driving of the pump system 410. Detection signals generated by the detection module 204 may be used to determine whether photon pairs are being generated at too high or too low a rate. If photon pairs 210 are being over generated in time intervals, then the feedback signal to the pump source system 410 may be used to decrease the output power of the pump source 410, for example by controlling the peak output power of any component in the pump source system 410 such as the optical source 460, modulator 470 and/or any other components such as optical amplifiers (not shown). Conversely if there are statistically too few photon pairs 410 being generated in time intervals output by the cavity (430,450), then the feedback signal provided to the pump source system 410 may be used to increase the power of the optical signal 420 entering the cavity (430,450).

The photon pair source and pump system 410, including any of the components described above, may be formed by using separate components and optically linking them using any of free space and bulk optics components, optical fibres and integrated optics. Additionally, or alternatively any two or more components may be integrated together using monolithic or hybrid integration.

In a preferred example, the photon pair source and pump system are arranged to produce signal and idler photons in the C-band (conventional band: 1530-1565 nm). For example, the idler photon 206 of a photon pair 210 has a frequency from among a plurality of frequencies in the region of around 1550 nm, and the corresponding signal photon 208 has a frequency from among a plurality of frequencies in the region of around 1580 nm. Many pieces of equipment, such as optical fibre interconnects, have been designed for telecommunications band light and so off-the-shelf components can be used to transport the generated signal and idler photons to other modules of the system 200.

Figure 5:
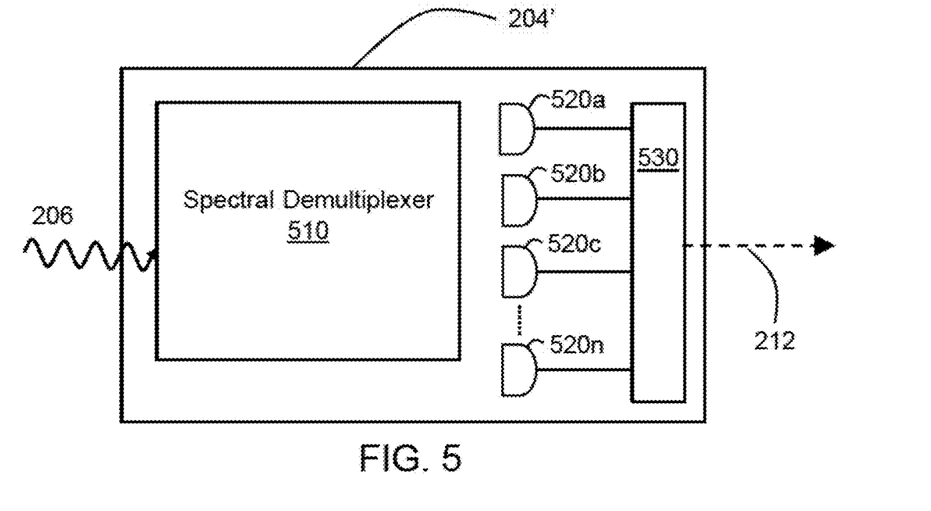
FIG. 5 shows an illustration of a detector module capable of generating a heralding signal based on a frequency of a photon according to an example.

FIG. 5 shows an illustration of a detection module 204' according to an example. The detection module 204' is configured to receive a first photon 206 of a photon pair 210 and to cause the generation of a heralding signal 212 based on a frequency of that detected first photon 206, the heralding signal 212 indicative of a frequency of the second photon 208 of the photon pair 210.

The detection module 204' comprises a spectral demultiplexer 510 for guiding photons along frequency-dependent lightpaths. The spectral demultiplexer 510 is configured to receive a first photon 206 of a photon pair 210 and to guide the first photon 206 along a spatial lightpath based on the frequency of the first photon 206 towards a corresponding detector. The spectral demultiplexer 510 may be implemented in a number of ways. For example, the spectral demultiplexer may comprise at least one of a prism, a fibre Bragg grating, a wavelength division multiplexer (WDM) or dense wavelength division multiplexer (DWDM), or a dichroic filter, or the spectral multiplexer 510 may be implemented using any other component(s) capable of spatially separating light of different frequencies.

The detection module 204' further comprises a detector arrangement 520, the detector arrangement comprising a plurality of photon detectors 520a to 520n. While four detectors are shown in FIG. 5, the skilled person will appreciate that the detector arrangement 520 may comprise more or fewer photon detectors.

Each of the photon detectors is coupled to a respective frequency-dependent lightpath of the spectral demultiplexer 510 such that a detection event at a particular photon detector (e.g. 520a) is associated with the detection of a photon having a specific frequency or having a frequency within a particular frequency range. The frequency range may depend on the choice of spectral demultiplexer and/or the arrangement of the detectors relative to the spectral demultiplexer. The photon detectors may be photon number resolving (PNR) detectors, capable of determining how many photons are received. For example, the detectors 520 may comprise superconducting nanowire detectors that generate an output signal intensity proportional to the (discrete) number of photons that strike a detector. PNR detectors are useful in circumstances where it is useful to know whether multiple photons are being generated in the same spectral mode at the same time. Alternatively, the photon detectors may not have PNR capabilities. For example, the detectors may comprise avalanche photodiodes.

The detection module 204 further comprises a controller 530 communicatively coupled to each of the photon detectors 520a to 520n. The controller 530 is configured to generate a heralding signal 212 in response to a detection event, the heralding signal indicative of a frequency of the second photon 208 corresponding to the detected first photon 206 of the photon pair. The controller 530 may be implemented in any suitable low-latency architecture, for example in a Field Programmable Gate Array (FPGA) or an Application Specific Integrated Circuit (ASIC).

The controller 530 may be configured to further generate a feedback signal for controlling the rate of generation of photon pairs produced by the photon pair source module 202, for example by controlling the power of a pump system (such as pump system 410). For example, if detection events are occurring at multiple photon detectors simultaneously, then the controller 530 may cause the rate of generation of photon pairs produced by the photon pair source module 202 to be decreased, while if no detection events are registered for a number of time intervals or a predetermined duration, then the controller 530 may cause the rate of generation of photon pairs produced by the photon pair source module 202 to be increased.

The skilled person will appreciate that the detection module 204' of FIG. 5 may comprise more components. Furthermore, the detection module 204' may be provided on-chip (with on-chip nanowire detectors for example) or may be provided in a distributed architecture (for example, in which the detector arrangement 520 is provided in one or more units in a server rack and the controller is provided in another one or more units in the server rack).

While the spectral demultiplexer 510 of FIG. 5 encodes the spectral information of the received first photons 206 in spatial modes (by guiding each photon to a particular spatially separated detector based on frequency), the skilled person will appreciate that other spectral demultiplexers may operate in other ways, for example by encoding the spectral information of received first photons 206 in temporal modes to be received by a single photon detector.

Figure 6:
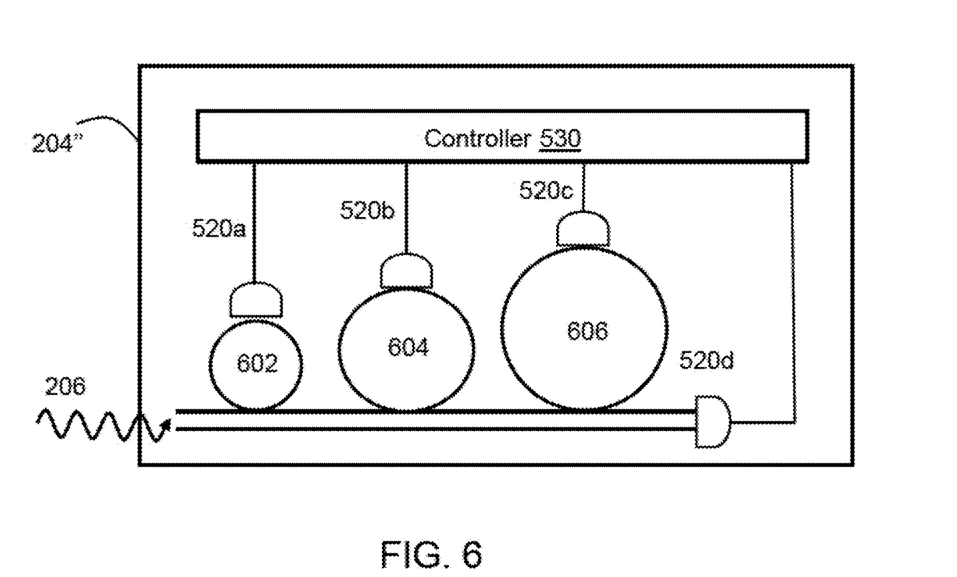
FIG. 6 shows an illustration of a detector module capable of generating a heralded signal based on a frequency of a photon according to an example.

FIG. 6 shows a detection module 204" according to an example. The detection module 204" utilises microresonators, and in particular whispering gallery mode (WGM) resonators to spectrally demultiplex incident photons. As will be appreciated by the skilled person, a microresonator 710 is resonator with sub-micron features and a closed-circuit object that supports an optical resonance. A microresonator supporting an optical resonance means the light that enters the closed circuit of the microresonator is amplified at at least one resonant frequency due to constructive interference and total internal reflection in the microresonator. Example materials for microresonators include silicon, silica, silicon nitride, lithium niobate and crystalline fluorides. Example diameters of microresonators range from microns to hundreds of microns.

The detection module 204" comprises a plurality of microresonators 602, 604, 606, each having a unique diameter to cause the microresonator to be resonant with a corresponding frequency that a received photon 206 may possess from among a plurality of frequencies. While only three microresonators are illustrated in FIG. 6, the skilled person will appreciate that there may be a different number of microresonators. A photon 206 having a frequency resonant with one of the microresonators will be coupled via that microresonator to a corresponding photon detector 520, and accordingly, the controller 530 is able to determine a frequency of the detected photon 206. FIG. 6 further shows a detector 520d that is not aligned with a corresponding microresonator and instead is arranged to receive a single photon 206 that is not coupled into a microresonator. The skilled person will appreciate that such a detector 520d may be omitted.

The detector module 204" further comprises an optical coupler. The optical coupler may be a waveguide, for example an on-chip waveguide. The optical coupler may be attached to a waveguide. The optical coupler may comprise a tapered optical fibre, or a prism. The optical coupler may guide light from a light source into a microresonator. The optical coupler may guide light from a microresonator to a detector. The optical coupler may be a buried waveguide, a ridge waveguide or a rib waveguide. The optical coupler may be fabricated at the same time as the microresonator.

Figure 7:
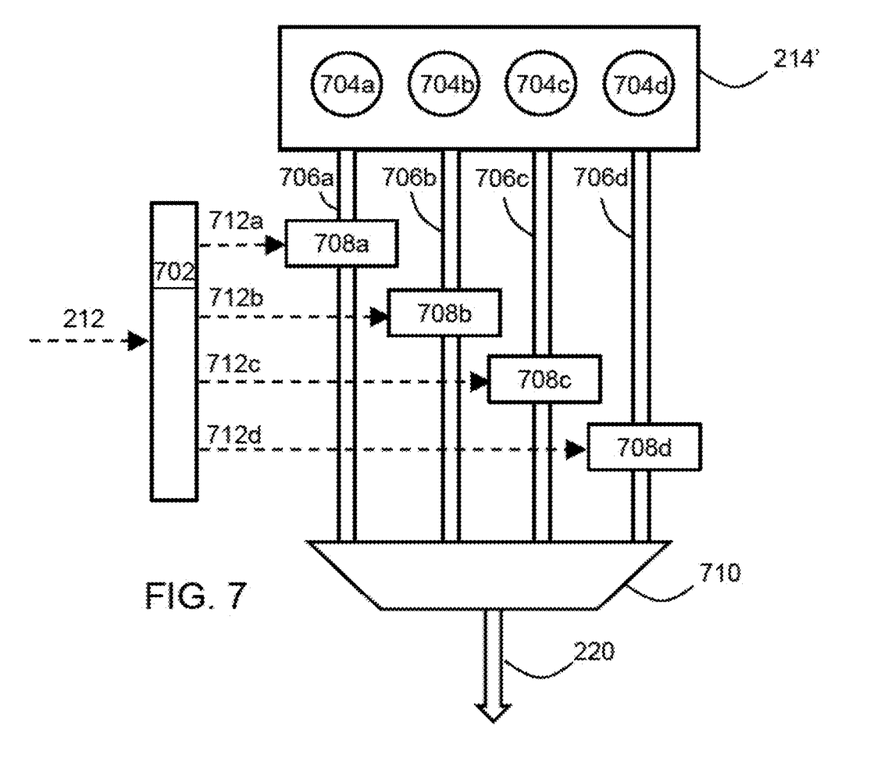
FIG. 7 shows an illustration of a pump module and a pump field selector according to an example.

FIG. 7 shows a pump module 214' and a pump field selector according to an example. The pump module 214' comprises a plurality of laser sources, in this example four laser sources 704a, 704b, 704c, 704d (although the skilled person would appreciate that the pump module 214' may comprise more or fewer laser sources), capable of generating four corresponding pump fields having four respective frequencies. Each pump field is propagated along an appropriate optical path 706a to 706d, which may be an optical fibre or other waveguide.

The laser sources may be any suitable laser sources, for example, external cavity-diode (ECD) lasers, distributed feedback (DFB) lasers, or distributed Bragg reflector (DBR) lasers. DFB lasers are particularly advantageous due to their tunability: for calibration purposes, after one selects a photon pair source module 202, it is desirable to have a pump module 214 that has tunable lasers in order to increase (e.g., maximise) the match between pump fields and second photons at the non-linear photonic element 222. In a preferred embodiment, the pump source module 202 is a CPDC source, and the pump module 214 comprises a plurality of DFB laser sources calibrated to (e.g., maximally) complement the frequencies of signal photons produced by the CPDC source for the non-linear photonic element 222.

The pump field selector is configured to receive a heralding signal 212 representative of the detection of a first photon of a frequency-correlated photon pair, the heralding signal indicative of a frequency of the second photon of the frequency-correlated photon pair. The pump field selector is further configured to select, based on the received heralding signal, a pump field.

The pump field selector comprises a controller 702. The controller 702 may be implemented in a Field Programmable Gate Array (FPGA) or an Application Specific Integrated Circuit (ASIC) or in any other suitable architecture. The controller 702 of FIG. 7 is configured to receive a heralding signal 212, and to generate one or more control signals (712a to 712d in the figure) to control which pump fields are filtered out. The one or more control signals may be electrical signals, photonic signals, magnetic signals or otherwise.

In examples, the controller 702 may be the same controller 530 of the detection module 204 or otherwise integrated with the controller 530 of the detection module. That is, controller 702 may additionally have the functionality described above in relation to the controller 530 of the detection module. In such circumstances, the heralding signal 212 may comprise one of a plurality of heralding signals directly generated by detectors 520 in response to detection events. The controller 702 may provide feedback signals to control the rate of generation of photon pairs by the photon pair source 202.

The pump field selector further comprises, for each laser source of the pump module 214', a corresponding controllable filtering element (708a to 708d) situated in the corresponding optical path (706a to 706d) between the pump module 214' and a wavelength combiner 710. Each filtering element 706a to 706d is configured to controllably prevent an unwanted (in other words, an unselected) pump field from reaching the wavelength combiner 710 in response to the one or more control signals (712a to 712d) or lack thereof. A filtering element preventing a pump field from reaching the wavelength combiner 710 may refer to the filtering element blocking or absorbing 99% or more of the pump light incident on the filtering element.

According to an example, at least one filtering element 708 comprises a semiconductor optical amplifier configured to controllably amplify or absorb the respective pump field with which it is aligned.

According to an example, at least one filtering element comprises a shutter.

According to an example, at least one filtering element comprises an EOM, more particularly a Mach-Zehnder.

According to an example, at least one filtering element comprises an electro-absorption modulator (EAM).

The unfiltered pump field (i.e. the selected pump field 220) is routed through the wavelength converter 710 towards the non-linear photonic element 212. The wavelength converter 710 is configured to receive any of the unfiltered pump fields at a corresponding input port and route the unfiltered pump field to an output port, and onwards towards the non-linear photonic element. The wavelength converter 710 may comprise, for example, a wavelength division multiplexer.

Figure 8:
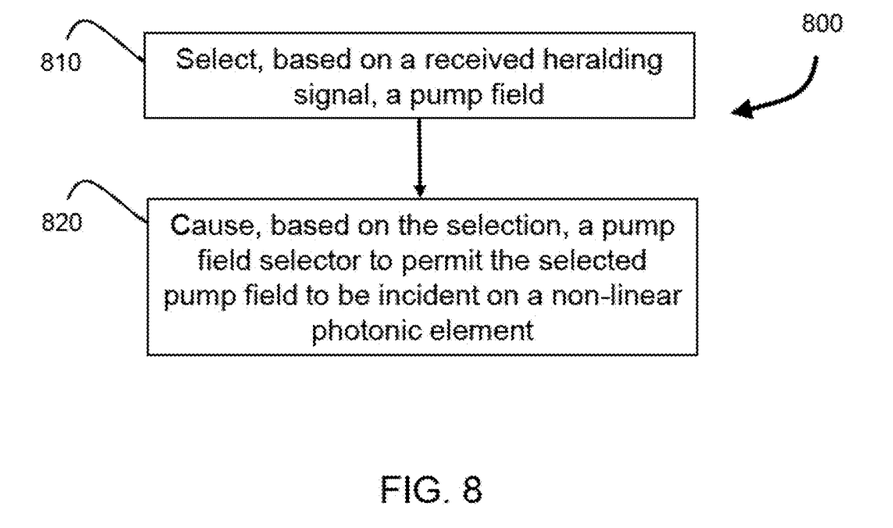
FIG. 8 shows a flowchart of a method for causing an output photon of a predefined frequency to be generated according to an example.

FIG. 8 shows a flowchart of a method for performance by a controller of system 200, such as controller 702.

At 810, the method comprises selecting, based on a received heralding signal 212, a pump field from a plurality of pump fields having a corresponding plurality of pump frequencies.

At 820, the method comprises causing, based on the selection, a pump field selector to permit the selected pump field to be incident on or be received by a non-linear photonic element. Said causing may comprise, for example, generating an appropriate one or more control signals to control the pump field selector to actively select a particular pump field by, for example, routing the selected pump field towards the non-linear element. Said causing may comprise, for example, generating an appropriate one or more control signals to control the pump field selector to filter out (e.g. all) unwanted pump fields, thereby passively selecting the particular mode of the frequency comb.

In some examples, the non-linear photonic element may have different conversion efficiencies for different frequencies of heralded second photons. In the event of a contemporaneous detection of two first photons of two frequency-correlated photon pairs, the two first photons having different frequencies, selecting a pump field (820) may comprise selecting a pump field that complements the heralded second photon of the pair of heralded second photons for which the non-linear photonic element has the greater conversion efficiency.

Variations of the described embodiments are envisaged.

The controller(s) described herein (for example in relation to the detection module 204 and pump field selector 218) may be embodied in hardware (e.g., on an integrated circuit), software, or a combination thereof. The controller(s) described herein may be configured to generate one or more signals to control hardware components to perform any of the methods described herein, such as those described in FIG. 3 or FIG. 8). A controller may be any kind of general or dedicated processor, such as a central processing unit (CPU), a graphics processing unit (GPU), or an integrated circuit.

Due to the speeds used to perform one or more of the methods described herein, it may be preferable to implement a controller for performing the method(s) in a dedicated, application-specific processing unit. For example, the controller may comprise an application-specific integrated circuit (ASIC) or an application-specific standard product (ASSP) or another domain-specific architecture (DSA). Alternatively, the controller may be implemented in adaptive computing hardware (that is, hardware comprising configurable hardware blocks or configurable logic blocks) that has been configured to perform the functions, for example in a configured field programmable gate array (FPGA).

Also described herein is a computer-readable storage medium having stored thereon a computer-readable circuit description of a controller. The circuit description, when processed by a controller generation system, causes the controller generation system to manufacture or otherwise generate an implementation of the controller.

The computer-readable circuit description may be in the form of computer code defining an implementation of the controller at any level. For example, the circuit description may comprise a hardware description language (HDL) description of the controller and/or a netlist. The circuit description may comprise (but is in no way limited to) one or more of (i) register transfer level (RTL) code, (ii) a high-level circuit representation such as Verilog or VHDL, and/or (iii) a low-level circuit representation such as OASIS®, GDSII, a bit file or other configuration file for configuring adaptive computing hardware to implement the controller. High-level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

The computer-readable circuit description may further include software which runs on the controller defined by the circuit description or in combination with the controller defined at the circuit description. For example, the circuit description, when processed by a controller generation system, may cause the controller generation system to, on manufacturing or otherwise generating the controller, load firmware onto that controller in accordance with program code defined at the circuit description or otherwise provide program code with the controller for use with the controller.

The controller generation system may be any system suitable for generating a controller (or at least an implementation thereof) by processing the computer-readable circuit description. As an example, if the controller is to be implemented in adaptive computing hardware, then the controller generation system may comprise a desktop or laptop computer or other computing hardware (having processing capability such that it can execute instructions), that is capable of configuring/loading a configuration file onto the adaptive computing hardware to thereby manufacture/generate an implementation of the controller. For example, manufacturing or otherwise generating an implementation of the controller may comprise configuring adaptive computing hardware by preparing and loading a configuration file provided as a part of or otherwise derived from the circuit description.

As another example, the controller generation system may comprise an integrated circuit manufacturing system (ICMS). The ICMS may comprise a layout processing subsystem configured to receive and process the computer-readable circuit description to determine a circuit layout. Methods of determining a circuit layout from a computer-readable circuit description are known in the art, and for example may involve synthesising RTL code to determine a gate level representation of a circuit to be generated, e.g. in terms of logical components. This may be done automatically or with user involvement in order to optimise the circuit layout. When the layout processing system has determined the circuit layout it may output a circuit layout definition to a manufacturing subsystem. The manufacturing subsystem may manufacture an integrated circuit embodying the controller by utilizing a semiconductor device fabrication process to generate the integrated circuit, which may involve a multi-step sequence of photo lithographic and chemical processing steps during which electronic circuits are gradually created on a wafer made of semiconducting material. For example, manufacturing or otherwise generating an implementation of the controller may comprise producing a circuit layout and utilizing a semiconductor device fabrication process to generate an integrated circuit based on that circuit layout.

A computer-readable storage medium may be, for example, but not limited to, an electronic, magnetic, optical, electromagnetic, infrared, or semiconductor system, apparatus, device, or any suitable combination thereof. More specific examples of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The word "module" has been used herein in relation to hardware functionality but is not intended to necessarily refer to distinct units: for example, the functionality of "two modules" may be combined into a single "module".

As used in this description and the claims, the singular forms "a", "an", and "the" include the plural forms unless the context clearly dictates otherwise.

All the features disclosed in this specification (including any accompanying claims, abstract and drawings), and/or all of the steps of any method or process so disclosed, may be combined in any combination, except combinations where at least some of the features and/or steps are mutually exclusive.

Each feature disclosed in this specification (including any accompanying claims, abstract or drawings), may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the spirit and scope of the claims.

What is claimed is:

1. A system for producing an output photon having a predefined frequency, the system comprising:
    a pump module comprising one or more pump laser sources, the pump module configured to produce pump fields at a plurality of pump frequencies;
    a photon pair source configured to generate a frequency-correlated photon pair;
    a detector module comprising one or more photon detectors, the detector module configured to generate a heralding signal subsequent to detecting a first photon of the frequency-correlated photon pair, the heralding signal indicative of a frequency of a second photon of the frequency-correlated photon pair;
    a pump field selector configured to:
        receive the heralding signal from the detector module; and
        select, based on the received heralding signal, at least one pump field of the pump fields;
    a controller configured to control the pump field selector to select the at least one pump field subsequent to receiving the heralding signal; and
    a non-linear photonic element comprising a beam combiner with non-linear material, the non-linear photonic element configured to receive the second photon and the selected at least one pump field, the non-linear photonic element configured to produce the output photon having the predefined frequency;
    wherein:
        the non-linear photonic element has different conversion efficiencies for different frequencies of heralded second photons; and
        in the event of a contemporaneous detection of two first photons of two frequency-correlated photon pairs, the two first photons having different frequencies, the controller is configured to control the pump field selector to select the at least one pump field based further on the conversion efficiencies of the non-linear photonic element.

2. The system of claim 1, wherein the pump field selector comprises controllable filtering elements aligned with optical paths of the pump fields of the pump module and configured to controllably prevent unselected pump fields from reaching the non-linear photonic element.

3. The system of claim 2, wherein at least one filtering element comprises a shutter.

4. The system of claim 2, wherein at least one filtering element comprises a semiconductor optical amplifier configured to controllably amplify or absorb the respective pump field with which the semiconductor optical amplifier is aligned.

5. The system of claim 2, wherein at least one filtering element comprises an electro-optic intensity modulator.

6. The system of claim 5, wherein at least one electro-optic intensity modulator comprises a Mach-Zehnder interferometer.

7. The system of claim 2, wherein the system further comprises a wavelength combiner arranged to receive the selected at least one pump field from a filtering element and output the selected at least one pump field towards the non-linear photonic element.

8. The system of claim 7, wherein the wavelength combiner comprises a wavelength division multiplexer (WDM).

9. The system of claim 1, wherein the controller is implemented in an application specific integrated circuit (ASIC) or field programmable gate array (FPGA).

10. The system of claim 1, wherein at least a portion of the system is implemented on-chip.

11. The system of claim 1, wherein the photon pair source comprises:
    a cavity parametric down conversion photon pair source;
    a non-linear photonic structure within a photonic cavity; or
    a non-linear crystal waveguide.

12. The system of claim 1, wherein the detector module comprises:
    a spectral demultiplexer configured to guide photons along a plurality of frequency-dependent lightpaths,
    wherein each of the one or more photon detectors is coupled to a respective frequency-dependent lightpath of the spectral demultiplexer such that a detection event at a particular photon detector is associated with the detection of a photon having a frequency within a frequency range.

13. The system of claim 12, wherein the spectral demultiplexer comprises at least one microresonator that provides at least one of the frequency-dependent lightpaths.

14. The system of claim 1, wherein the controller comprises:

a central processing unit (CPU);
a graphics processing unit (GPU); or
an integrated circuit.

15. A method comprising:
selecting, based on a received heralding signal, at least one pump field from a plurality of pump fields having a plurality of pump frequencies; and
causing, based on the selected at least one pump field, a pump field selector to permit the selected at least one pump field to be incident on a non-linear photonic element;
wherein the received heralding signal is representative of a detection of a first photon of a frequency-correlated photon pair, the received heralding signal indicative of a frequency of a heralded second photon of the frequency-correlated photon pair;
wherein the non-linear photonic element is configured to receive the heralded second photon and to produce an output photon having a predefined frequency based on the frequency of the heralded second photon and a pump frequency of the selected at least one pump field; and
wherein:
the non-linear photonic element has different conversion efficiencies for different frequencies of heralded second photons; and
in the event of a contemporaneous detection of two first photons of two frequency-correlated photon pairs, the two first photons having different frequencies, selecting the at least one pump field is further based on the conversion efficiencies of the non-linear photonic element.

16. A controller configured to:
select, based on a received heralding signal, at least one pump field from a plurality of pump fields having a plurality of pump frequencies; and
cause, based on the selected at least one pump field, a pump field selector to permit the selected at least one pump field to be incident on a non-linear photonic element;
wherein the received heralding signal is representative of a detection of a first photon of a frequency-correlated photon pair, the received heralding signal indicative of a frequency of a heralded second photon of the frequency-correlated photon pair;
wherein the non-linear photonic element is configured to receive the heralded second photon and to produce an output photon having a predefined frequency based on the frequency of the heralded second photon and a pump frequency of the selected at least one pump field; and
wherein:
the non-linear photonic element has different conversion efficiencies for different frequencies of heralded second photons; and
in the event of a contemporaneous detection of two first photons of two frequency-correlated photon pairs, the two first photons having different frequencies, the controller is configured to select the at least one pump field based further on the conversion efficiencies of the non-linear photonic element.

17. The controller of claim 16, wherein the controller comprises:
a central processing unit (CPU);
a graphics processing unit (GPU); or
an integrated circuit.

18. A non-transitory computer-readable storage medium having stored thereon a computer-readable circuit description of a controller configured to:
select, based on a received heralding signal, at least one pump field from a plurality of pump fields having a plurality of pump frequencies; and
cause, based on the selected at least one pump field, a pump field selector to permit the selected at least one pump field to be incident on a non-linear photonic element;
wherein the received heralding signal is representative of a detection of a first photon of a frequency-correlated photon pair, the received heralding signal indicative of a frequency of a heralded second photon of the frequency-correlated photon pair;
wherein the non-linear photonic element is configured to receive the heralded second photon and to produce an output photon having a predefined frequency based on the frequency of the heralded second photon and a pump frequency of the selected at least one pump field;
wherein the computer-readable circuit description, when processed in a controller generation system, causes the controller to manufacture or otherwise generate an implementation of the controller; and
wherein:
the non-linear photonic element has different conversion efficiencies for different frequencies of heralded second photons; and
in the event of a contemporaneous detection of two first photons of two frequency-correlated photon pairs, the two first photons having different frequencies, the controller is configured to select the at least one pump field based further on the conversion efficiencies of the non-linear photonic element.

* * * * *